(12) United States Patent
Sundararajan

(10) Patent No.: US 8,442,831 B2
(45) Date of Patent: May 14, 2013

(54) SOUND ENVELOPE DECONSTRUCTION TO IDENTIFY WORDS IN CONTINUOUS SPEECH

(75) Inventor: Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 12/262,242

(22) Filed: Oct. 31, 2008

(65) Prior Publication Data

US 2010/0114576 A1    May 6, 2010

(51) Int. Cl.
G10L 13/08    (2006.01)

(52) U.S. Cl.
USPC ............ 704/260; 704/275; 704/255; 704/257; 704/268; 704/243; 379/88.03; 381/61; 381/56

(58) Field of Classification Search .................. 704/260, 704/275, 255, 253, 257, 243, 267, 252, 254, 704/206, 251, 270, 231, 268, 241; 379/88.03; 381/61, 56
See application file for complete search history.

(56) References Cited

U.S. PATENT DOCUMENTS

| | | | |
|---|---|---|---|
| 5,621,850 A * | 4/1997 | Kane et al. | 704/206 |
| 5,677,991 A * | 10/1997 | Hsu et al. | 704/255 |
| 5,708,759 A | 1/1998 | Kemeny | |
| 5,956,675 A * | 9/1999 | Setlur et al. | 704/231 |
| 6,006,185 A | 12/1999 | Immarco | |
| 8,165,880 B2 * | 4/2012 | Hetherington et al. | 704/253 |
| 2006/0239471 A1 * | 10/2006 | Mao et al. | 381/92 |
| 2007/0288238 A1 * | 12/2007 | Hetherington et al. | 704/248 |

OTHER PUBLICATIONS

Rabiner, Lawrence et al., "Theory and Application of Digital Signal Processing," Prentice-Hall, New Jersey, 1975.
Gold, Ben et al., "Speech and Audio Signal Processing," John Wiley & Sons, Inc., 2000.

* cited by examiner

Primary Examiner — Vijay B Chawan
(74) Attorney, Agent, or Firm — Ronald A. Kaschak, Esq.; Blanche E. Schiller, Esq.; Heslin Rothenberg Farley & Mesiti P.C.

(57) ABSTRACT

A speech recognition capability in which words of spoken text are identified based on the contour of sound waves representing the spoken text. Variations in the contour of the sound waves are identified, features are assigned to those variations, and then the features are mapped to sound constructs to provide the words.

20 Claims, 15 Drawing Sheets

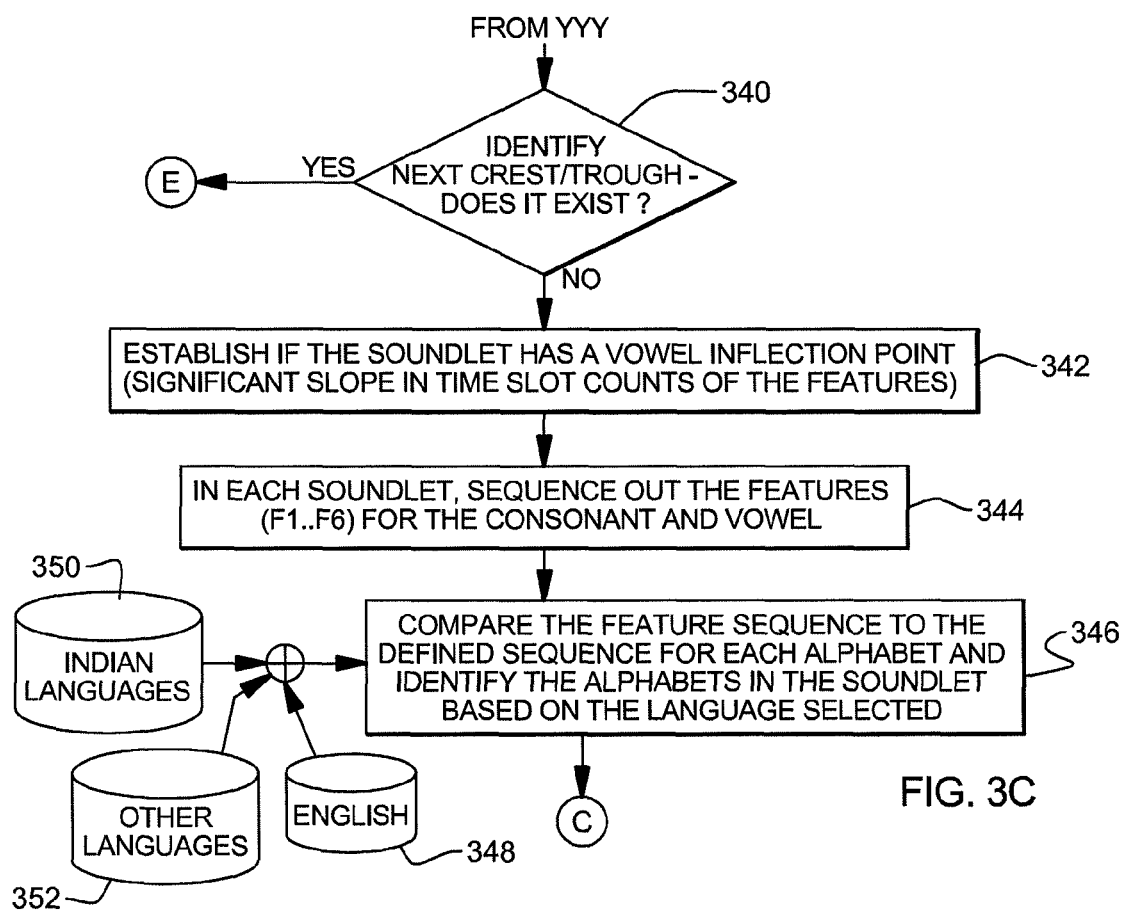
FIG. 3C
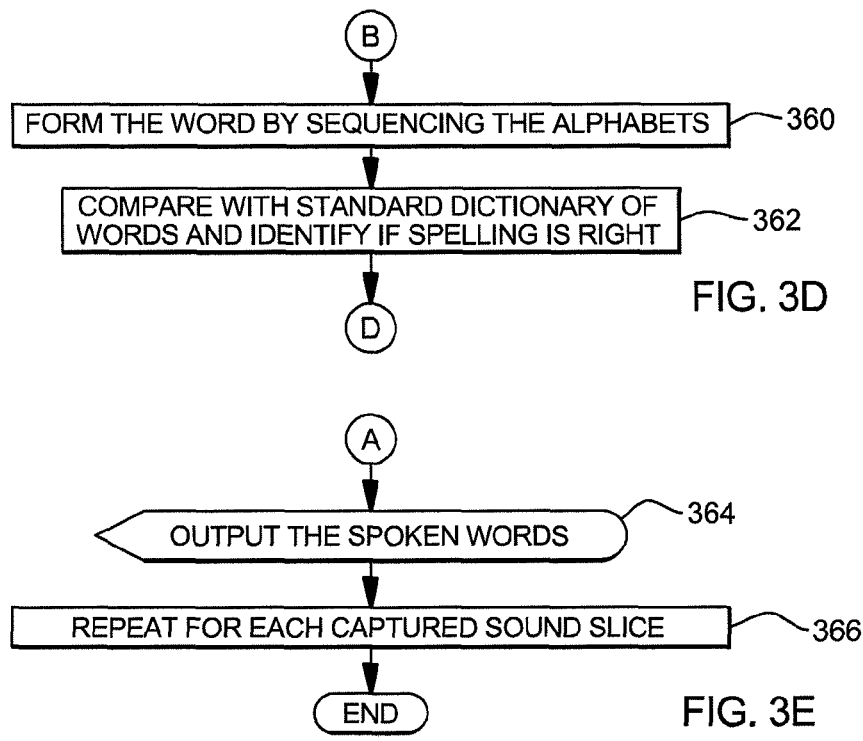
FIG. 3D
FIG. 3E

SOUND ENVELOPE DECONSTRUCTION TO IDENTIFY WORDS IN CONTINUOUS SPEECH

TECHNICAL FIELD

This invention relates, in general, to speech recognition, and in particular, to facilitating the identification of spoken words in continuous speech via deconstruction of the sound envelope representing those spoken words.

BACKGROUND OF THE INVENTION

Speech recognition enables users to interact with devices using spoken words. There are many technologies today that enable speech recognition. Some of the current technologies include techniques that predominantly analyze the speech spectrograms.

In one approach, a window (e.g., Hamming window, etc.) of 20 to 50 milliseconds (cepstral extraction) is applied, and then the spectrum of the captured waveform is measured and compared against the spectrum samples in a library of sounds. The comparison finds distances for the set of features and the feature with the minimum distance is selected.

Additionally, the currently known solutions require training of the tool by the speakers to supplement the pre-training from the corpus. Several HMM's (Hidden Markov Models) are set up to help with the identification of words represented by the sounds. Sometimes, statistical language models, semantic interpretation and acoustic models, such as phoneme based models, are also used to help identify the spoken word.

SUMMARY OF THE INVENTION

Although various technologies are available for speech recognition, enhancements are still desired. As an example, a technique is desired which does not rely on frequency analysis. Further, a capability is needed in which little or no training of the tool is required. Yet further, a need exists for a capability that is usable to identify words in a continuous speech segment recorded with a normal microphone on the lower end of sound capture rate features.

The shortcomings of the prior art are overcome and additional advantages are provided through the provision of a method of identifying words in a speech segment. The method includes, for instance, obtaining, by a device, a speech segment; and determining, by the device, one or more words of the speech segment, the determining, for a word, including, for instance, identifying one or more soundlets within the word and for a soundlet analyzing a contour of at least a portion of a sound wave of the soundlet to determine one or more variations within the contour; assigning one or more features to the one or more variations; and mapping the one or more features to one or more sound constructs, wherein the one or more sound constructs are at least part of the word.

Systems and computer program products relating to one or more aspects of the present invention are also described and claimed herein. Further, services relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 3A-3E depict further details of one embodiment of the logic associated with recognizing speech, in accordance with an aspect of the present invention;

DETAILED DESCRIPTION OF THE INVENTION

In accordance with an aspect of the present invention, a speech recognition capability is provided in which words are identified in a speech segment based on the contour of sound waves representing the spoken words of that speech segment. For example, variations in the contour of the sound waves of the speech segment are identified, features are assigned to those variations, and then the features are mapped to sound constructs (e.g., consonants and vowels) for recognition of words within the speech segment. Sounds are identified based on splitting the recorded sound signal into its components, identifying and coding the components based on patterns of the wave form into the alphabets, and constructing the words the sounds represent.

Figure 1:
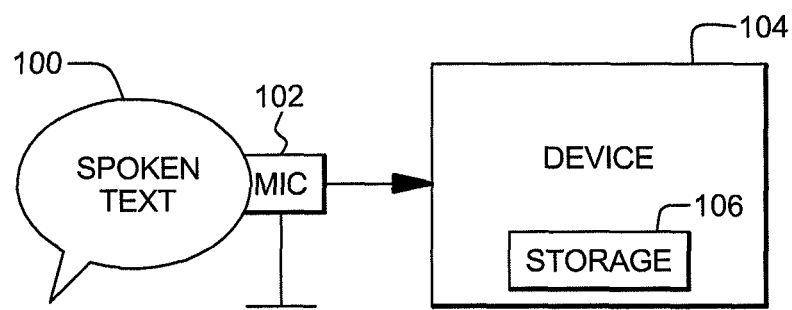
FIG. 1 depicts one example of an environment to incorporate and use one or more aspects of the present invention.

One embodiment of an environment to incorporate and use one or more aspects of the present invention is described with reference to FIG. 1. As shown in FIG. 1, spoken text 100 is input into a microphone 102 by, for instance, a user speaking into the microphone. The microphone can be any off-the-shelf basic microphone or any other microphone with advanced acoustic capabilities. The microphone is coupled to a device 104, which can be one of various devices including, but not limited to, any type of computing device (e.g., a computer), a computing component (e.g., a circuit), a cell phone, or any other type of device that can accept speech. In one example, the device includes storage 106 or is coupled to storage for storing a dictionary, and may or may not include a display.

The device receives the spoken text as sound waveforms and analyzes the contour of the sound waveforms. The analysis identifies variations in the waveforms, and assigns features to the variations. The features are used to identify sounds constructs (e.g., consonants and vowels) of the spoken text. Therefrom, words are formed. This processing is further described with reference to FIG. 2 and FIGS. 3A-3E. In particular, a general overview of the process is described with reference to FIG. 2, and further details are discussed with reference to FIGS. 3A-3E.

Figure 2:
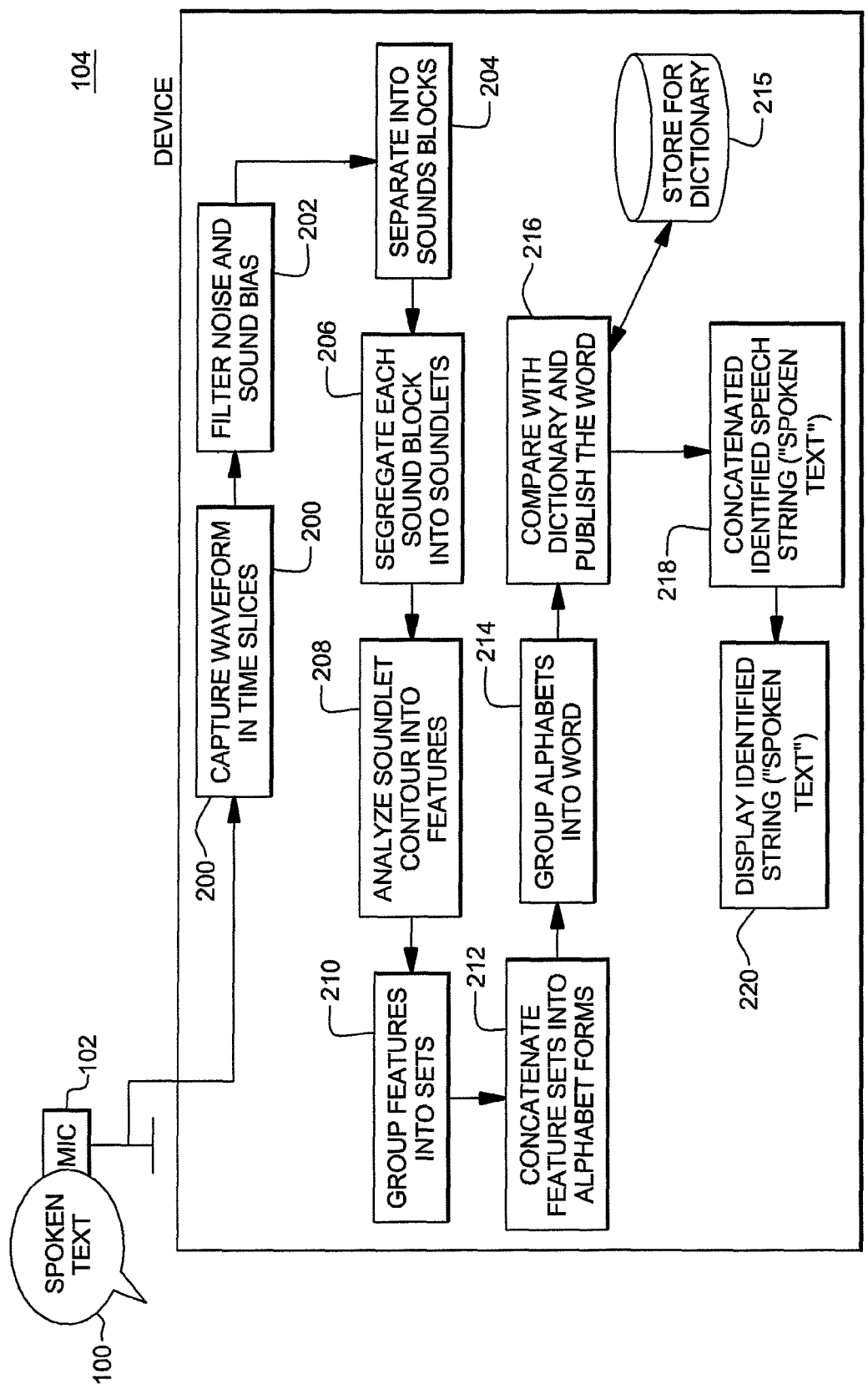
FIG. 2 depicts one example of processing to be performed by a device of FIG. 1 to recognize speech, in accordance with an aspect of the present invention.

Referring initially to FIG. 2, spoken text 100 is transmitted via microphone 102 to device 104. Device 104 captures the waveform of the spoken text in time slices, STEP 200. As an example, each time slice is x (e.g., 10) seconds long. Thus, the spoken text is captured at 10 second intervals. Although 10 seconds is used, any other desired time may be used.

The device then filters the noise and sound bias, STEP 202. There are existing techniques to filter noise, including low pass Bessels filters, described in *Theory and Application of Digital Signal Processing*, by Lawrence R. Rabiner and Bernard Gold, June 1975, which is hereby incorporated herein by reference in its entirety. To filter the sound bias, as is known, a shift is performed to return to zero.

The captured waveform is then separated into sound blocks (e.g., words), STEP 204, and each sound block is segregated into one or more soundlets based on, for instance, periods of silence observed in the captured waveform, STEP 206. For each soundlet, the contour of the waveform for that soundlet is analyzed providing one or more features, STEP 208. The features are grouped into sets, STEP 210, and the feature sets are concatenated into alphabet forms, STEP 212. The alphabets are then grouped into a word, STEP 214. The word is compared with a dictionary 215 to validate the word, and the word is published, STEP 216. This is repeated for the other sound blocks of the captured waveform. Then, the identified words are concatenated into a sentence, which is written as text on the device, STEP 218, and optionally displayed or spoken, STEP 220.

Further details regarding the logic for continuous speech recognition, and in particular, the sound envelope deconstruction approach of one or more aspects of the present invention, are described with reference to FIGS. 3A-3E. Further, reference is also made to the diagrams of FIGS. 4A-4G.

Figure 3A:
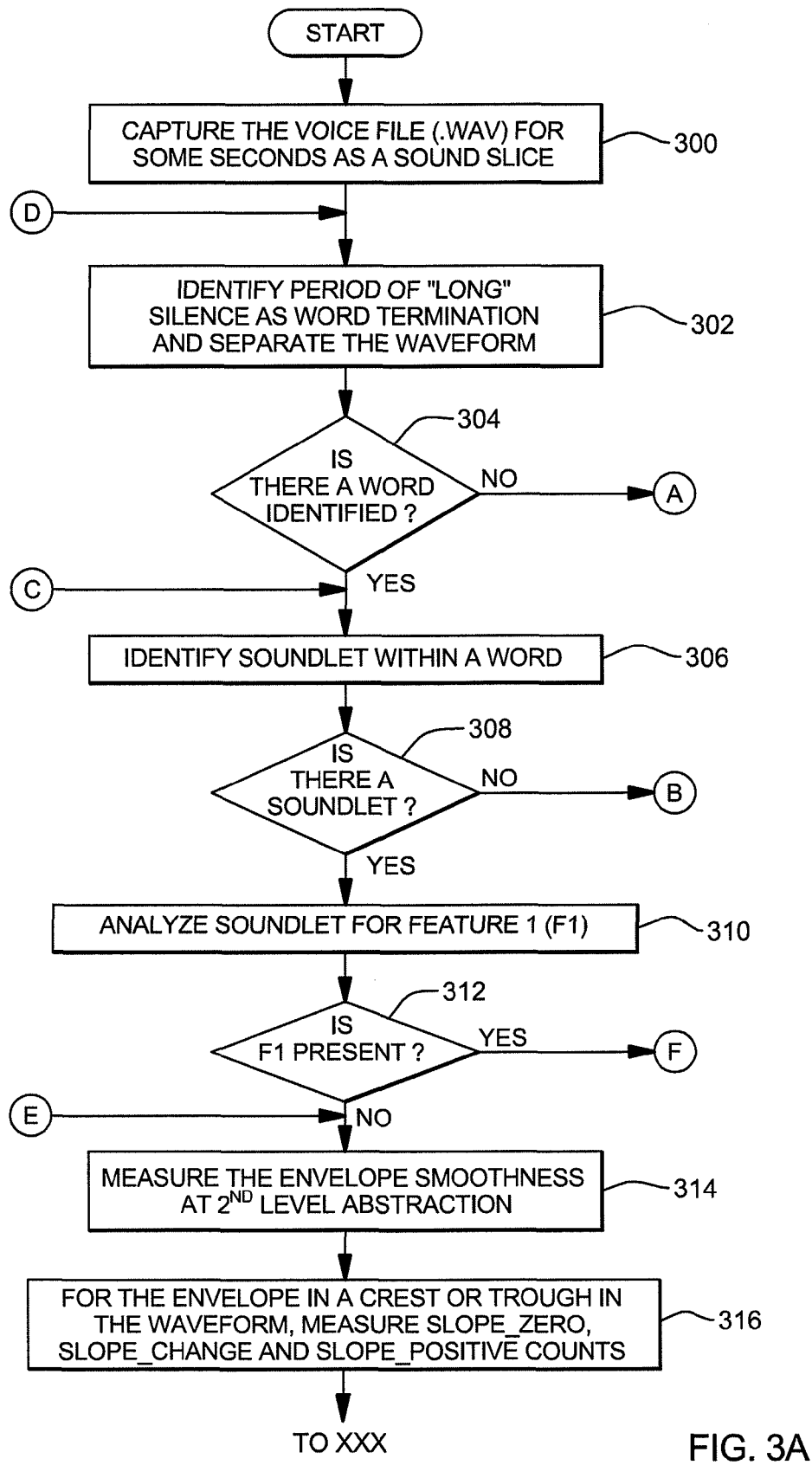
Figure 3B:
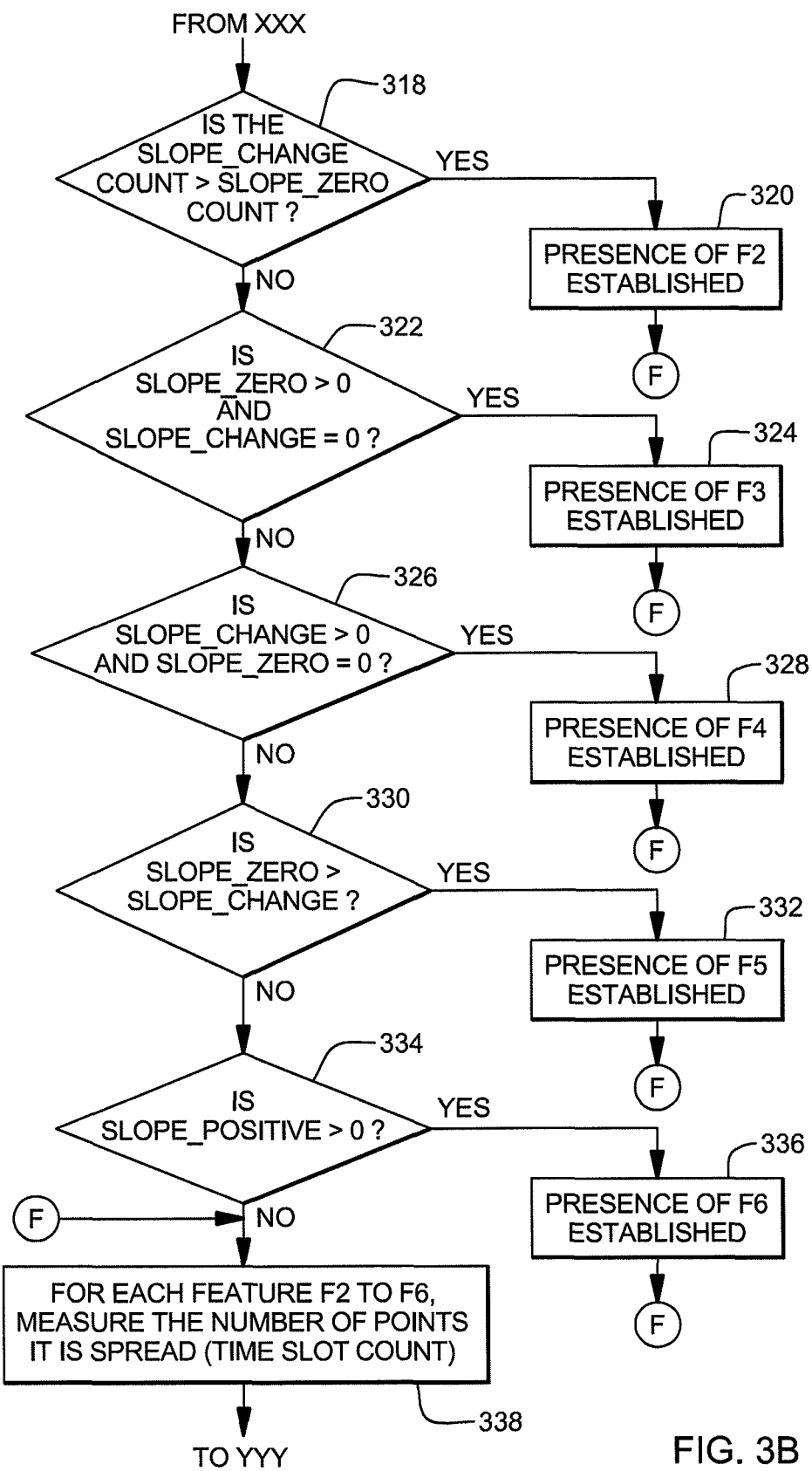

Referring initially to FIG. 3A, a voice file is captured for a desired number of seconds (e.g., 10 seconds), STEP 300. In particular, the sound waves are captured from the microphone and saved in the computer as a wave file (.wav), which is an audio file. Other forms of audio files can also be similarly processed. As described with reference to FIG. 2, the captured waveform is filtered and rendered for further processing.

Thereafter, the time slice is separated into one or more sound blocks (e.g., words). This is accomplished by identifying periods of "long" silence, which indicate word terminations, STEP 302. In particular, the waveform is analyzed to identify both the positive and negative variations of the waveform. A period of silence is looked for in which the waveform is close to zero. In this particular example, 100 or 200 milliseconds of silence (i.e., zero or close to zero waveform) indicates a word termination. Although 100 or 200 milliseconds is used in this example, other amounts of time may be used.

If a word is identified, INQUIRY 304, then a soundlet within the word is identified, STEP 306. For example, the waveform is analyzed for 40 to 80 milliseconds of near zero value. (In other examples, other amounts of time may be used.) If there is 40-80 milliseconds of near zero value in the word waveform, as an example, then a soundlet is present. A word is composed of one or more soundlets.

Figure 4A:
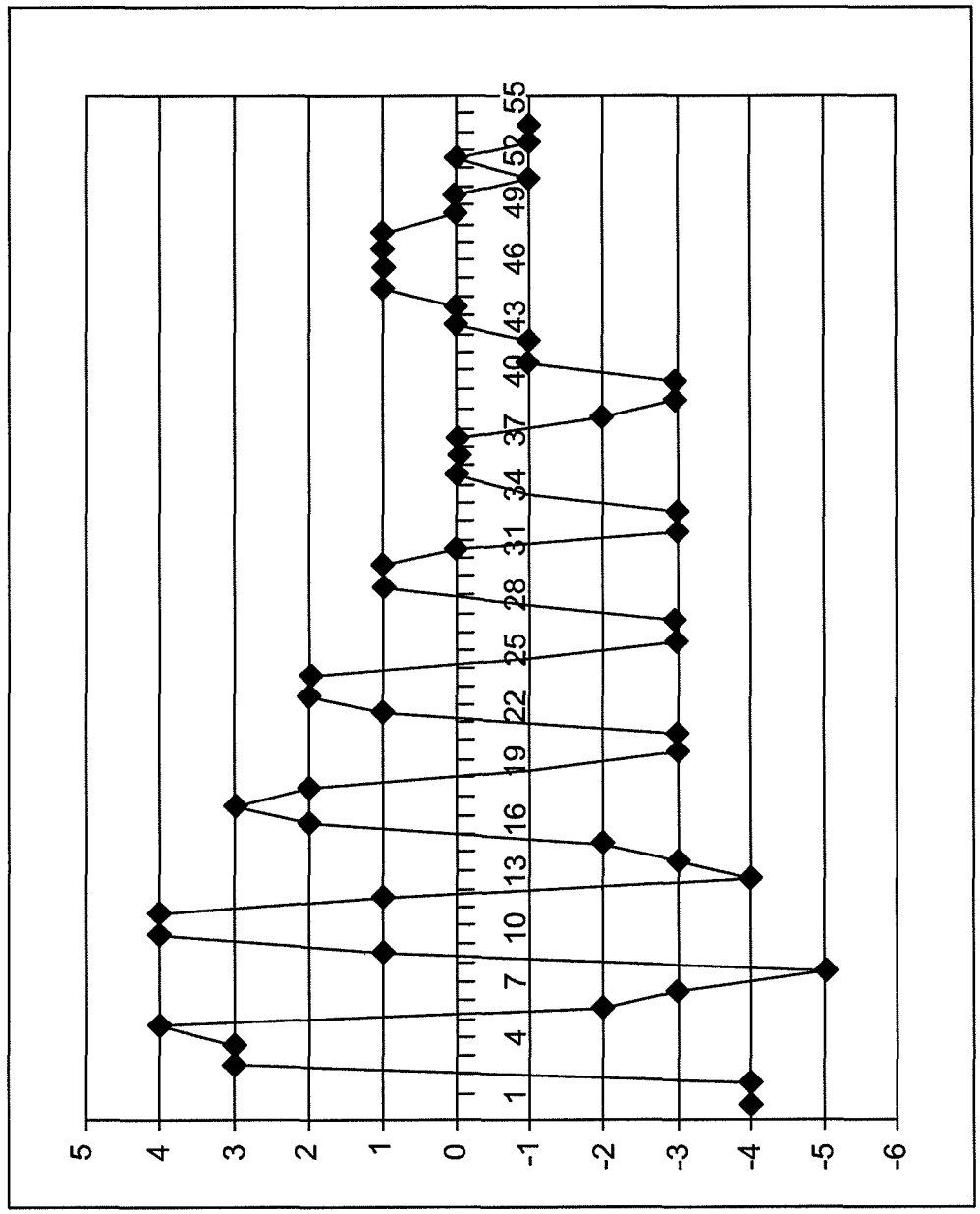
FIGS. 4A-4F depict example waveforms of six features, respectively, used to determine spoken sound constructs, in accordance with an aspect of the present invention.

If a soundlet is found, INQUIRY 308, then the soundlet is analyzed to determine if it includes one or more specified features (e.g., Features 1-6), described below. In particular, in one example, the contour of the waveform representing the soundlet is analyzed to determine if Feature 1 (F1) is present. In one example, Feature 1 (referred to as a sound whorl) is derived by analyzing the sound contour over a period when it varies across the central value (e.g., zero), as depicted in FIG. 4A. Feature 1 is identified as being present when the envelope of the waveform varies rapidly (e.g., <5 msec period for a crest or trough) at least, for instance, five times between negative and positive regions around the zero value. (As used herein, a crest is the envelope waveform in the positive region and the trough is the envelope waveform in the negative region.)

If Feature 1 is present, INQUIRY 312, then processing continues at STEP 338 (FIG. 3B), as described below. However, if Feature 1 is not present, INQUIRY 312 (FIG. 3A), then processing continues to determine if one or more of features F2-F6 is present. Each of the features (F2 . . . F6) is derived from analyzing the contour of the wave in the crest and trough durations (in the positive and negative half-waves).

For features F2 . . . F6, the following definitions are applicable:
1. Slope(m)=(val(n)+val(n+2))−2*(val(n+1))—where val is the val at an instance and n is a sample point in the wave. A wave can have 90-100 sample points, in one example. This is applied to compute the slope of the envelope when it is not monotonically changing.
2. Val=slope(m)*slope(m−1).

If val is negative, then it is counted as a slope_change.
If val is zero, then it is counted as slope_zero.
If val is positive, then it is counted as slope_positive.

Thus, if F1 is not present, processing continues with measuring the envelope smoothness at a second level of abstraction, STEP 314. This includes calculating the slope of the contour of the waveform. If the slope is 0, the envelope is smooth. Further, for a crest or trough in the waveform, slope_zero, slope_change and slope_positive counts are measured, STEP 316.

Figure 4B:
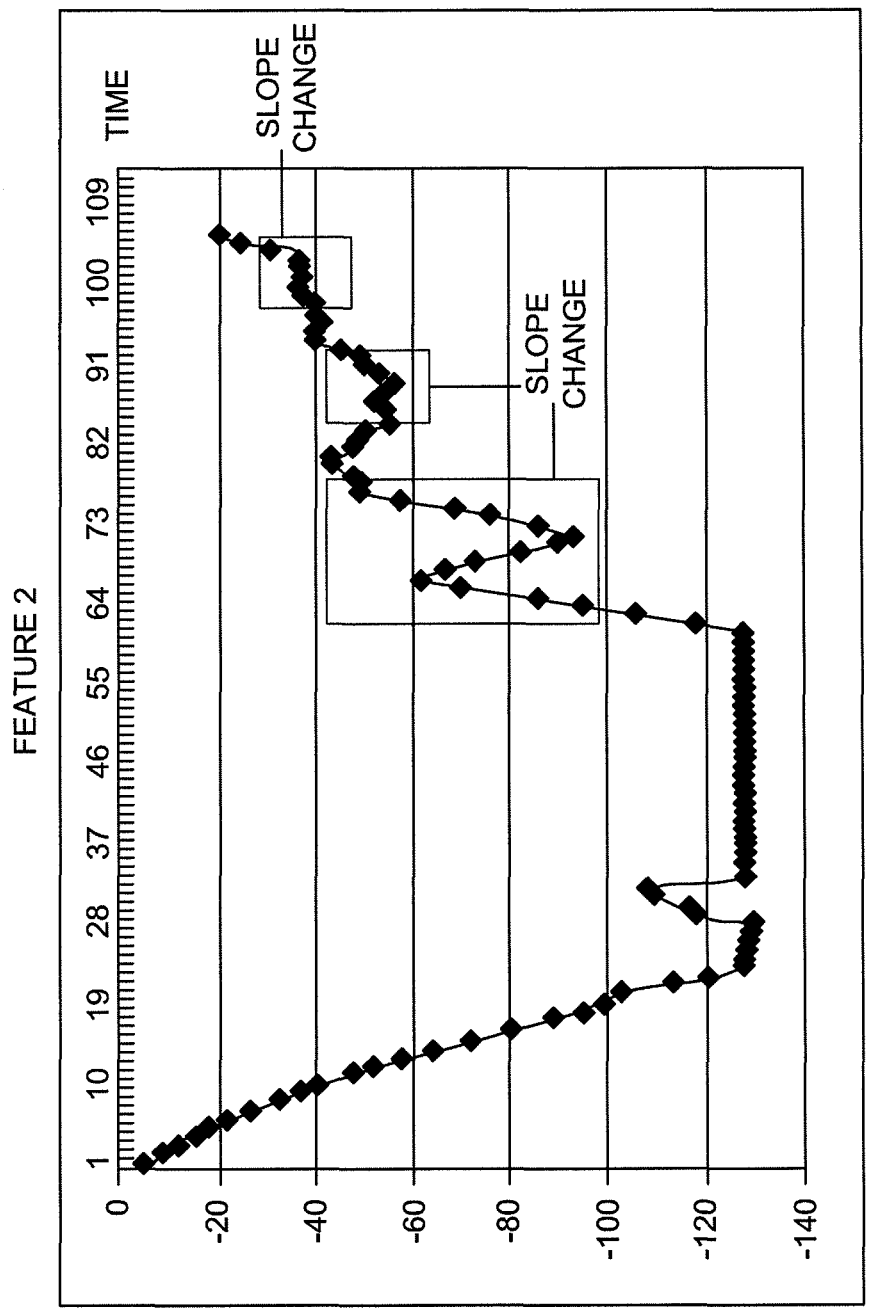

If the slope_change count is greater than the slope_zero count, INQUIRY 318 (FIG. 3B), then the presence of F2 is established, STEP 320. One example of the characteristics of F2 is depicted in FIG. 4B. This feature appears on a half-wave (positive (crest) or negative (trough)), in which the sound envelope is not monotonic and has variations. In these variations, slope_change>slope_zero. Subsequent to establishing the presence of F2, processing continues at STEP 338, as described below.

Figure 4C:
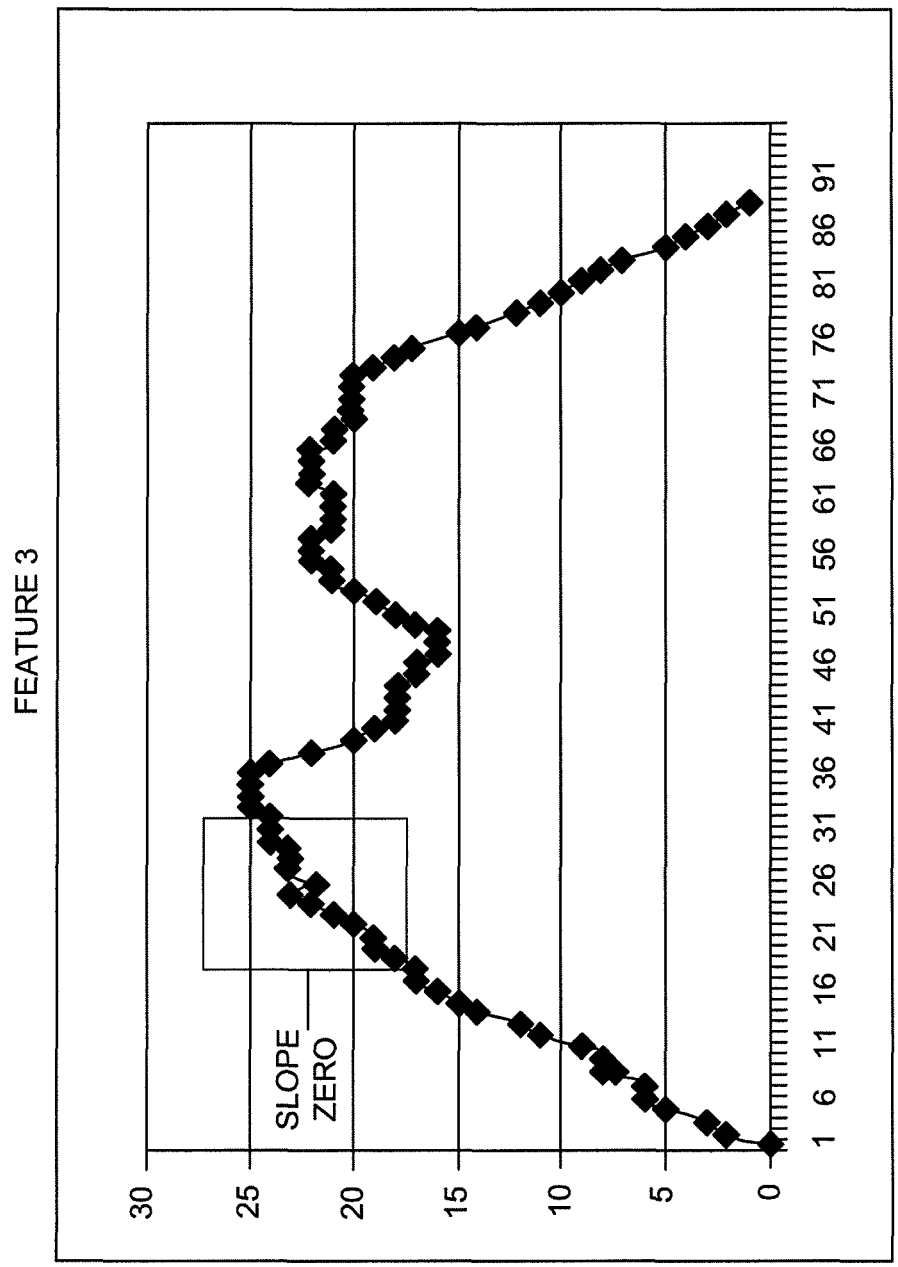

Returning to INQUIRY 318, should the slope_change count not be greater than the slope_zero count, then a further determination is made as to whether slope_zero is greater than zero and slope_change is equal to zero, INQUIRY 322. If so, then the presence of F3 is established, STEP 324. This is depicted in FIG. 4C. This feature appears on a half-wave (positive or negative), in which the sound envelope is not monotonic and has variations. In these variations, slope_zero>0 and slope_change=0. Processing then continues at STEP 338.

Figure 4D:
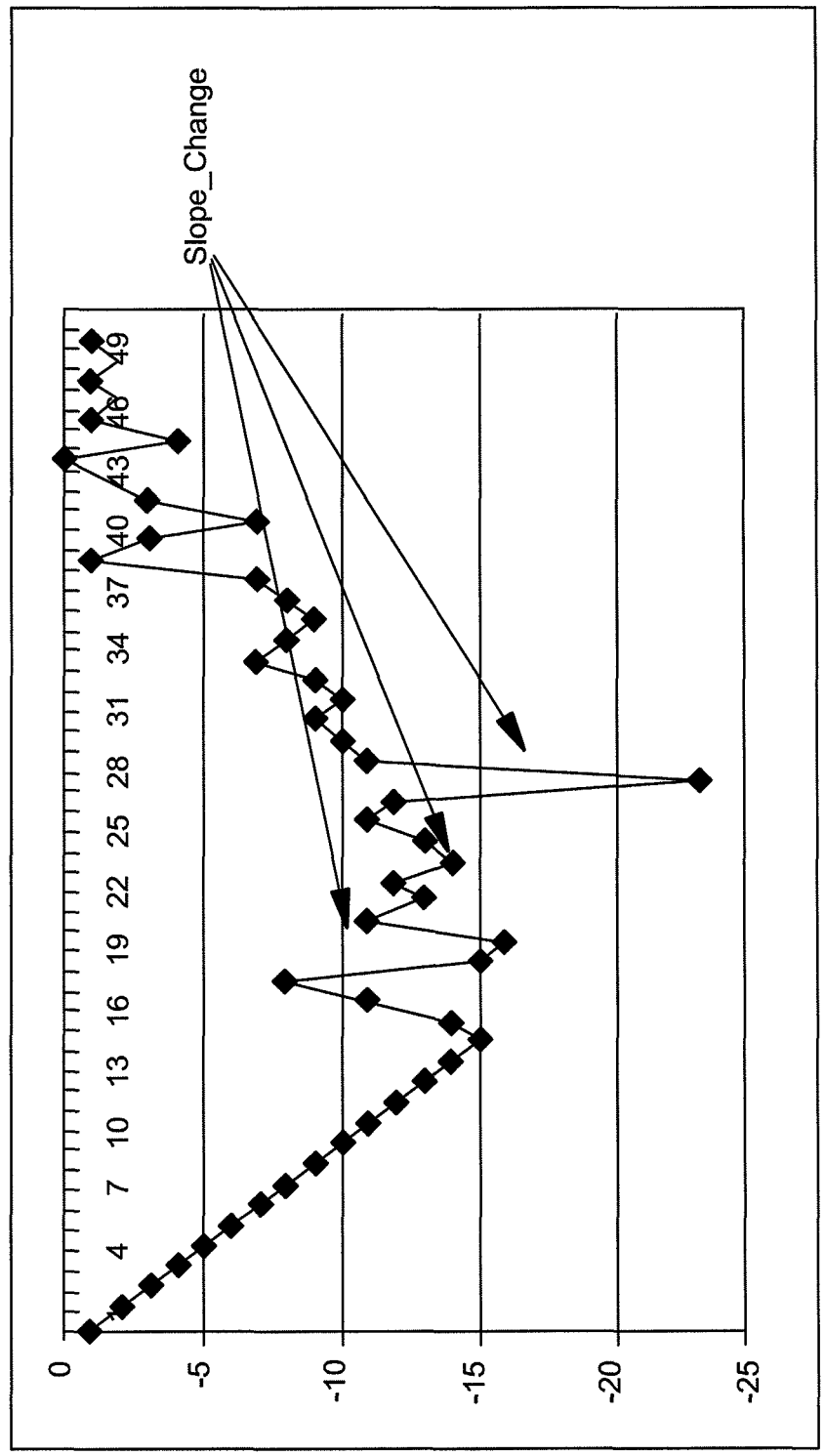

Referring to INQUIRY 322, if that test fails, then a further test is made as to whether slope_change is greater than zero and slope_zero is zero, INQUIRY 326. Should slope_change be greater than zero and slope_zero be zero, then the presence of F4 is established, STEP 328. One example of this feature is depicted in FIG. 4D. This feature appears on a half-wave (positive or negative), in which the sound envelope is not monotonic and has variations. In these variations, slope_change>0 and slope_zero=0. Processing then continues at STEP 338.

Figure 4E:
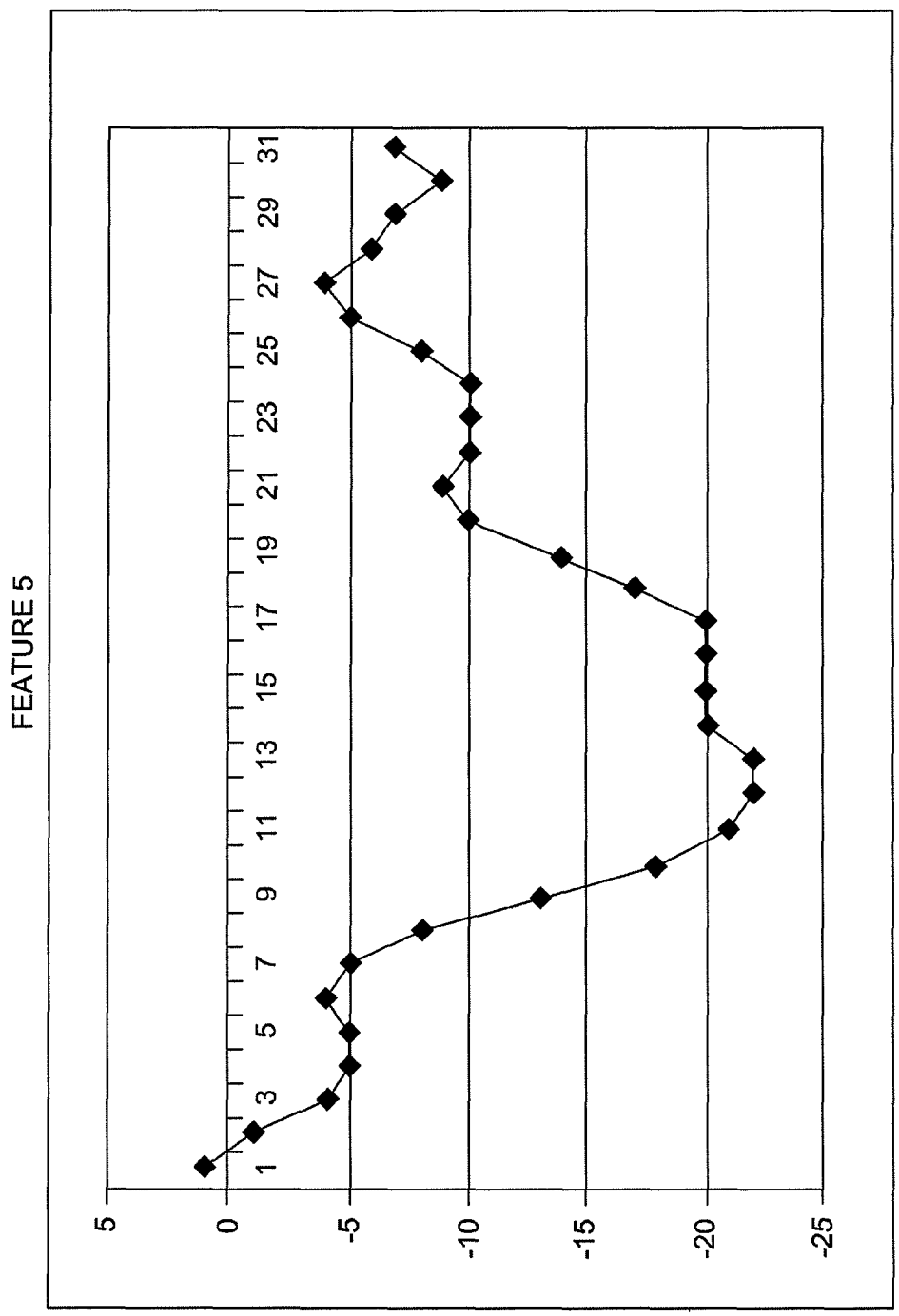

Returning to INQUIRY 326, if the test is negative, then a further determination is made as to whether slope_zero is greater than slope_change, INQUIRY 330. If slope_zero is greater than slope_change, then F5 is established, STEP 332, an example of which is depicted in FIG. 4E. This feature appears on a half-wave (positive or negative), in which the sound envelope is not monotonic and has variations. In these variations, slope_zero>slope_change. Processing then continues at STEP 338.

Figure 4F:
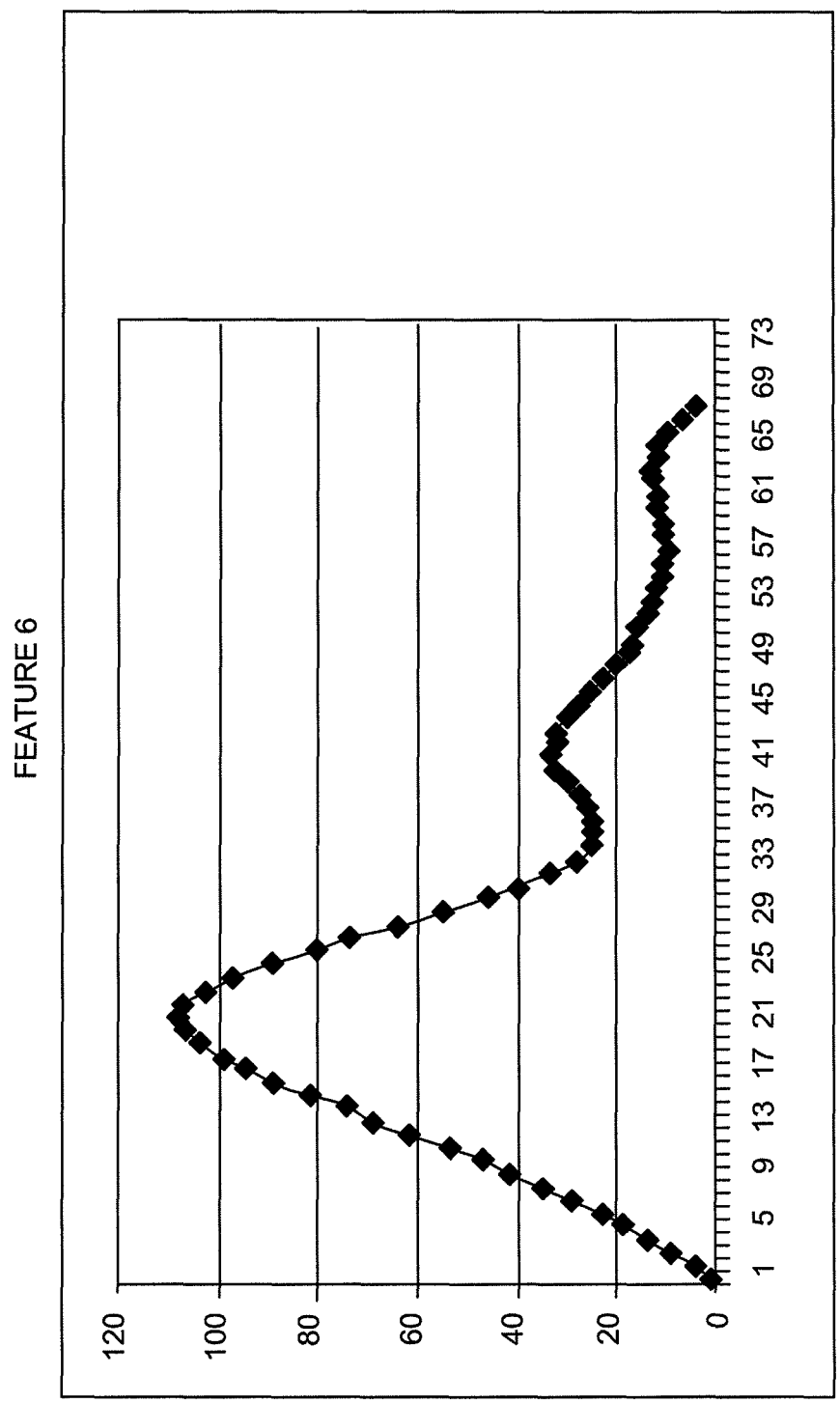

If slope_zero is not greater than slope_change, INQUIRY 330, then a test is made to see whether slope_positive is greater than zero, INQUIRY 334. If slope_positive is greater than zero, then F6 is present, STEP 336. An example of F6 is depicted in FIG. 4F. This feature appears on a half-wave (positive or negative), in which the sound envelope is not monotonic and has variations. In these variations, slope_positive>0. Processing then continues at STEP 338. Processing also continues at STEP 338, should slope-positive be less than or equal to zero.

At STEP 338, for each feature F2 to F6, the number of points in the spread is measured (time slot count). This measures the duration of the feature, which helps define whether the feature is significant and whether the soundlet is a vowel or a consonant, as described below.

Figure 4G:
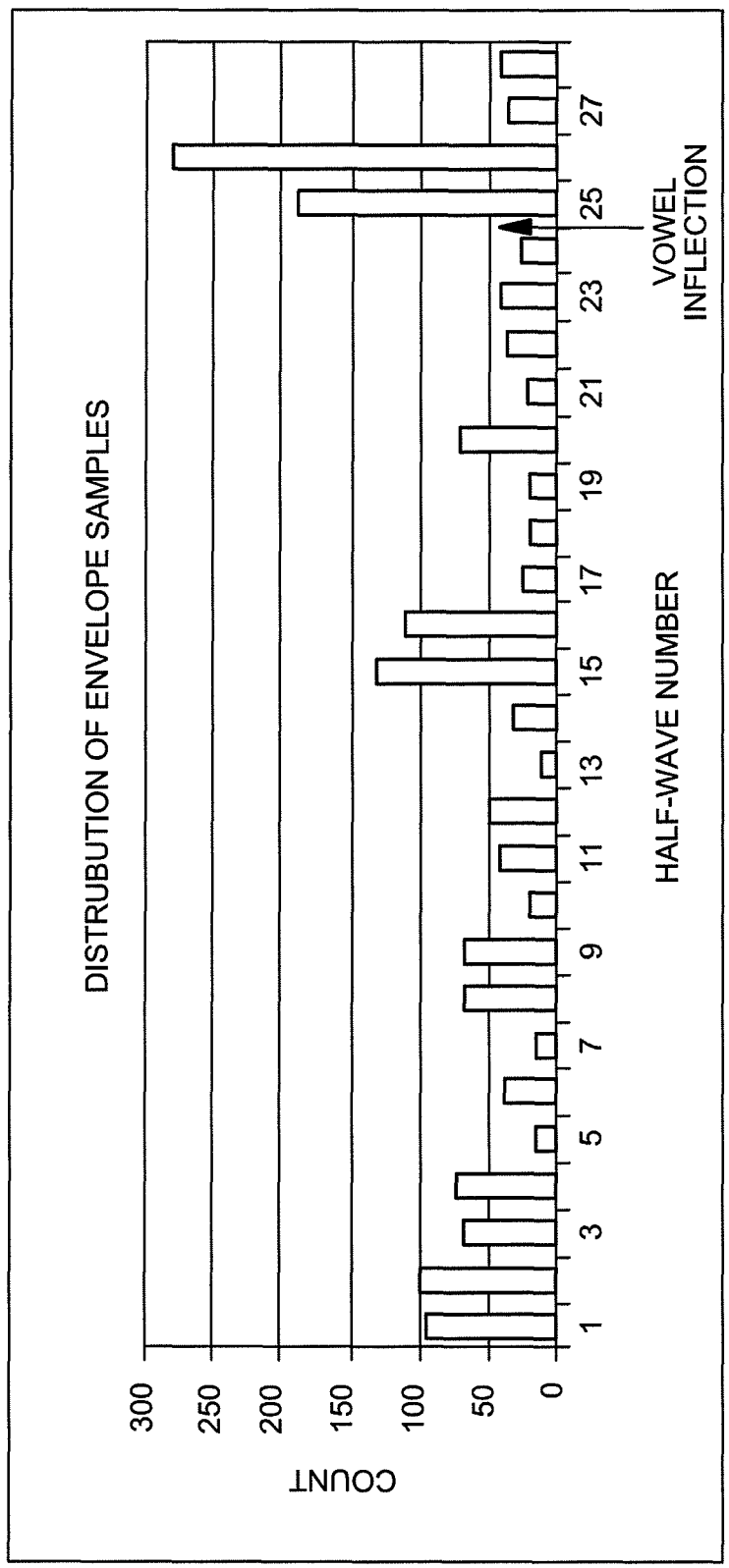
FIG. 4G depicts one example of a distribution of envelope samples used to identify a vowel, in accordance with an aspect of the present invention.

Thereafter, a determination is made as to whether another crest/trough exists, INQUIRY 340 (FIG. 3C). Should another crest/trough exist, processing continues at STEP 314 (FIG. 3A), as described above. Otherwise, if another crest/trough does not exist, processing continues with establishing if the soundlet has a vowel inflection point (e.g., a significant slope in time slot counts of the features), STEP 342. One example of a vowel inflection point is depicted in FIG. 4G. To differentiate a vowel within a soundlet, the duration of the waveform in the positive or negative zone over a set of cycles (at least 4) is measured. This will show a distribution pattern with a sharp differentiation (e.g., 2 or more crests or troughs with a longer duration), as shown in FIG. 4G. This assessment shows the separation point in the soundlet after which the envelope represents a vowel. For the different vowels, the same features (F2 . . . F6) being present are characteristics to identify the vowel. That is, a feature F2 . . . F6 is considered a vowel if that feature has an associated inflection point. It is indicated herein as F2(v) . . . F6(v).

Returning to FIG. 3C, subsequent to determining if there is at least one vowel in the soundlet, the features identified for the soundlet are sequenced out (i.e., placed in order of identification), STEP 344. In one example, this sequencing includes providing a sequence of the dominant features. That is, the time slot counts are used to determine which features are dominant. In one example, this determination is made by comparing the time slot counts of the features and eliminating those features that do not seem to have adequate numbers compared to the other features. (In another example, other ways to select may be used or all features may be selected.) The dominant features are then placed in order of identification.

Next, the feature sequence that is identified is compared to a defined sequence for each alphabet and the alphabets in the soundlet are identified based on the language selected, STEP 346. As examples, the selected language can be English 348, an Indian language 350, or other languages 352, such as German, French, etc.

Examples of words and their defined sequence in English are depicted below:

| Sl No | Word | Feature set | Identified word pattern |
| --- | --- | --- | --- |
| 1 | Cat | (F1, F2, F4(v), F6(v)), F3 | Ca, t |
| 2 | Gate | (F2, F5, F4, F2(v), F6(v)), F3 | Gae, t |
| 3 | Cheetah | (F6, F3, F5(v), F2(v)), F4, F5, F6(v), F5(v) | Chee, tha |
| 4 | Threw | (F4, F5), F2, F5, F2, F3, F3(v), F4(v), F5(v) | Th, ru |
| 5 | Bald | (F5, F2, F5, F6(v), F5(v)), (F5, F6, F4), (F5, F2) | Ba, l, d |
| 6 | Pray | (F2, F5), F2, F5, F2, F3, F2(v), F6(v) | P, re |
| 7 | Wild | (F3, F5, F2, F5(v), F2(v), F6(v)), (F5, F6, F4), (F5, F2) | Wi, l, d |
| 8 | There | (F5, F3, F5(v), F3(v)), F2, F3 | The, r |

The sample of words show the features that are identified from the sound envelope of the recorded words. The features in parenthesis represent the features in the soundlet from the significant half-waves. To identify the patterns of the vowels, the feature is extended with (v) such as F4(v), F2(v), etc.

A similar mapping can be made to the phone types in the TIMIT database. The following table provides the mapping between the TIMIT database Phone Types and the identified significant feature set sequence.

| TIMIT Phone | Feature set | TIMIT Phone | Feature set | TIMIT Phone | Feature set |
| --- | --- | --- | --- | --- | --- |
| Pcl (p closure) | F4, F6, F5 | em | F2 (v), F6 (v), F5, F2 | z | F6, F4, F5 |
| Tcl (t closure) | F3, F4 | ng | F5, F2, F3, F5 | zh | F5, F2, F4, F3 |
| Kcl (k closure) | F1, F2, F4 | nx | F3, F4, F5 | n | F2, F5, F6 |
| Bcl (b closure) | F5, F4, F5 | l | F5, F6, F4 | en | F5, F2, F3 |
| Dcl (d closure) | F5, F3, F2, F4 | w | F3, F6, F3, F2 | eng | F5 (v), F4 (v), F5 (v), F5, F4 |
| Gcl (g closure) | F2, F4, F5 | hh | F5, F4, F6 | el | F5, F6, F3 |
| p | F2, F5 | er | F5 (v), F3 (v)F2, F3 | r | F2, F5, F2, F3 |
| t | F5 | iy | F5 (v), F2 (v) | y | F3, F4, F6 |
| k | F1, F2 | ey | F2 (v), F6 (v), F2 (v), F5 (v) | hv | F2 (v), F5 (v), F6 (v) |
| q | F3 | ae | F2 (v), F6 (v), F5 (v) | axr | F2 (v), F5 (v), F3, F2 |
| b | F5, F2, F5 | ao | F2 (v), F5 (v) | ih | F4 (v), F5 (v) |
| d | F5, F2 | ow | F5 (v), F2 (v), F5 (v) | eh | F2 (v), F6 (v) |
| g | F2, F5, F4 | uw | F3 (v), F2 (v), F5 (v) | aa | F6 (v), F5 (v) |

-continued

| TIMIT Phone | Feature set | TIMIT Phone | Feature set | TIMIT Phone | Feature set |
|---|---|---|---|---|---|
| ch | F6, F5 | aw | F2 (v), F4 (v), F5 (v) | ah | F2 (v), F5 (v), F2 (v) |
| f | F2, F5, F4, F5 | oy | F3 (v), F5 (v), F2 (v) | uh | F3 (v), F5 (v) |
| th | F4, F5 | ax | F4 (v), F2 (v), F3 (v) | ux | F4 (v), F3 (v) |
| s | F3, F5, F2, F5, F4, F3, F6 | dx | F5 (v), F6 (v), F5 (v), F2 (v) | ay | F5 (v), F2 (v), F6 (v) |
| sh | F4, F2, F5 | jh | F4, F6 | ax-h | F4 (v), F6 (v) |
| m | F4, F6, F3 | v | F3, F5, F2 | ix | F2 (v), F3 (v), F2 (v), F6 (v) |
| — | — | dh | F3, F5 | — | — |

The above is described in TIMIT Phone Types from "Speech and Audio Signal Processing"—Ben Gold, Nelson Morgan, Jul. 22, 1999, p. 313, which is hereby incorporated herein by reference in its entirety.

Thus, using one of the above tables, which are stored in the device, the sequence of identified features are compared to the feature sets in the selected table to obtain the appropriate consonant(s) and vowel(s) of the soundlet.

Processing then continues at STEP 306 (FIG. 3A), in which another soundlet in the word is attempted to be identified. If there is a soundlet, INQUIRY 308, then processing continues with STEP 310, as described above. However, if there is no soundlet, then processing continues with forming the spoken word by sequencing the alphabets determined from the above comparisons, STEP 360 (FIG. 3D). Optionally, the word is then compared with the standard dictionary of words of that language to identify if the spelling is correct, STEP 362.

Next, a determination is made as to whether there are other words in the captured segment, STEP 302 (FIG. 3A). If so, processing continues with STEP 306, as described herein. Otherwise, processing continues at STEP 364 (FIG. 3E), in which the spoken words are output. Further, the above is repeated for each captured sound slice, STEP 366. This completes processing of the logic to identify spoken words via sound envelope deconstruction.

Described in detail above is a capability for speech recognition by identification of words in a speech segment based on the contour/envelope of the sound wave/signal. Sound wave/signal features are mapped to sound constructs (consonants and vowels) for recognition of words. The mapping of wave features to sound constructs (consonants and vowels) are found to be consistent across speakers. It is established that different speakers construct the words identically from these features.

In yet a further aspect of the present invention, a technique is provided for deploying one or more aspects of the sound recognition logic on one or more devices (e.g., processors, processing units, computers, cell phones, circuits, etc.). One embodiment of the deployment logic is described with reference to FIGS. 5A-5B.

Figure 5A:
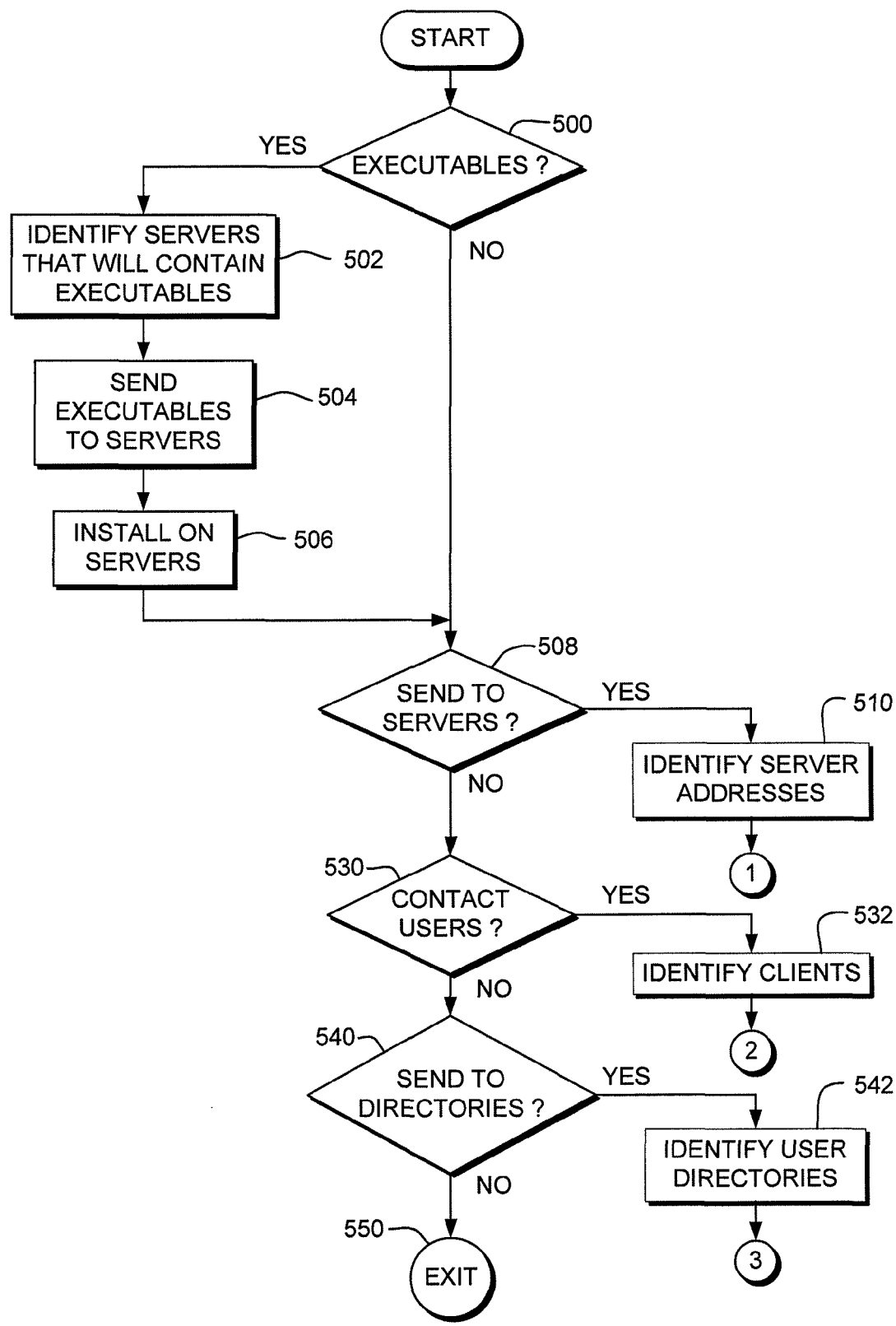
FIGS. 5A-5B depict one embodiment of the logic associated with deploying speech recognition logic on one or more devices, in accordance with an aspect of the present invention.

Referring to FIG. 5A, initially, a determination is made as to whether there are any programs that are to reside on one or more servers when the sound recognition logic is executed, INQUIRY 500. If so, then the one or more servers to include the executables are identified, STEP 502, and the sound recognition logic for the one or more servers is transferred directly to the servers' storage via, for instance, a File Transfer Protocol (FTP) or some other protocol or by copying through the use of a shared file system, STEP 504. The logic is then installed on the servers, STEP 506.

Figure 5B:
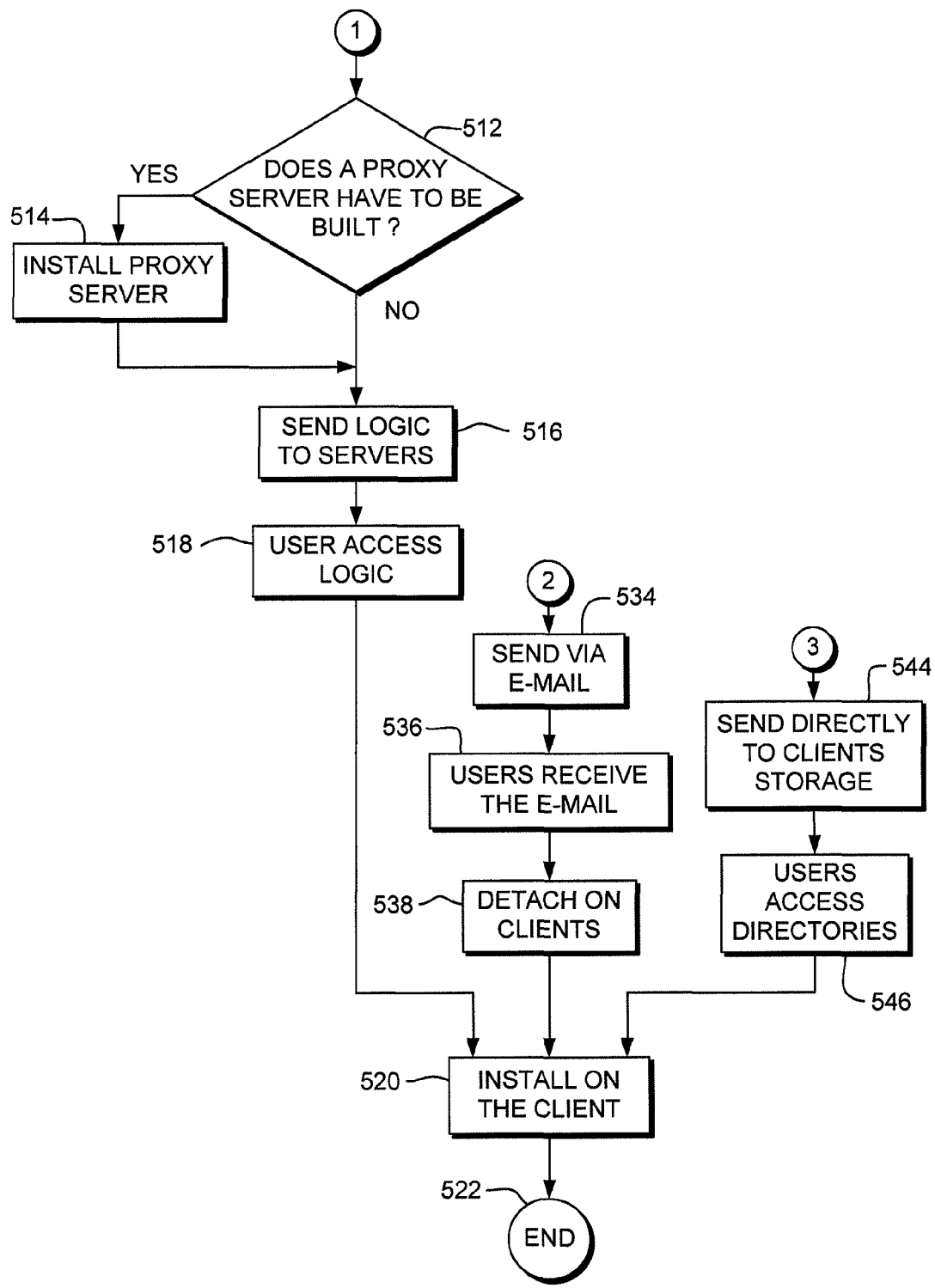

Thereafter, or if there are no executables, a further determination is made as to whether the sound recognition logic is to be deployed by having users access the logic on a server or servers, INQUIRY 508. If the users are to access the sound recognition logic on servers, then the server addresses that are to store the logic are identified, STEP 510. In one example, a determination is made as to whether a proxy server is to be built to store the sound recognition logic, INQUIRY 512 (FIG. 5B). A proxy server is the server that sits between a client application, such as a web browser, and a real server. It intercepts the requests to the real server to see if it can fulfill the request itself. If not, it forwards the request to the real server. Two primary benefits of the proxy server are to improve performance and to filter requests. If a proxy server is to be built, then the proxy server is installed, STEP 514.

Thereafter, or if a proxy server is not to be built, the sound recognition logic is sent to the server either via a protocol, such as file transfer protocol (FTP), or it is copied directly from the source files to the server files via file sharing, STEP 516. As another example, a transaction is sent to the one or more servers that includes the sound recognition logic and the servers process the transaction, then receive and copy the logic to the servers' file systems.

After the sound recognition logic is stored at the servers, the users, via their client computers, access the logic on the servers and may copy at least a portion of the logic to their client computers' file systems, STEP 518. The user then executes the program that installs the logic on the client computer, STEP 520. In a further example, the servers automatically copy one or more aspects of the sound recognition logic to each client and then run the installation program for the logic at each client computer. This concludes one example of the deployment processing, STEP 522.

Returning to INQUIRY 508 (FIG. 5A), if the logic is not to be deployed by having users access the logic on one or more servers, then processing continues with a determination as to whether the logic is to be deployed by sending the logic to users via e-mail, INQUIRY 530. If so, the set of users where the logic is to be deployed is identified together with the addresses of the user client computers, STEP 532. The sound recognition logic is sent via e-mail to each of the user's client computers, STEP 534 (FIG. 5B). The users receive the e-mail, STEP 536, and detach the sound recognition logic from the e-mail to a directory on their client computers, STEP 538. The user executes the program that installs the logic on the client computer, STEP 520, and exits the process, STEP 522.

Returning to INQUIRY 530 (FIG. 5A), if the sound recognition logic is not to be deployed via e-mail, then a further determination is made as to whether the logic is to be sent directly to user directories on their client computers, STEP 540. If so, the user directories are identified, STEP 542. The sound recognition logic is directly transferred to the user's client computer directory, STEP 544 (FIG. 5B). This can be done in several ways, such as, but not limited to, sharing of the file system directories and then copying from the sender's file system to the recipient user's file system, or alternatively, using a transfer protocol, such as file transfer protocol (FTP). The users access the directories on their client file systems in preparation for installing the sound recognition logic, STEP 546. The user executes the program that installs the logic on the client computer, STEP 520, and exits the deployment process, STEP 522.

Returning to INQUIRY 540 (FIG. 5A), if the logic is not to be sent directly to the users' directories, then processing ends, STEP 550.

Although an embodiment of deploying logic is provided, many variations can be made without departing from the spirit of the present invention.

One or more aspects of the present invention can be included in many types of devices, including, but not limited to, computers, circuits, cell phones, dictaphones, telephone to display spoken messages, voice mails, etc.

Moreover, one or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 6:
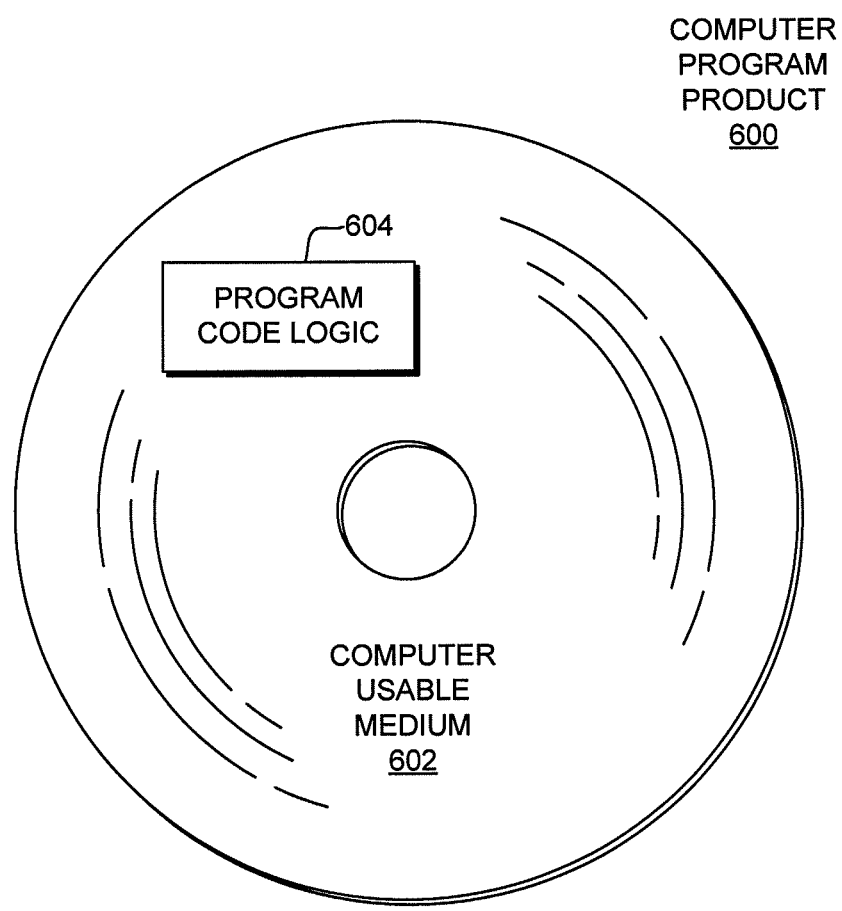
FIG. 6 depicts one embodiment of a computer program product incorporating one or more aspects of the present invention.

One example of an article of manufacture or a computer program product incorporating one or more aspects of the present invention is described with reference to FIG. 6. A computer program product 600 includes, for instance, one or more computer usable media 602 to store computer readable program code means or logic 604 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, the speech recognition capability of the present invention accommodates the various patterns that are created during speaking. As speakers vary the way they spell out the sounds based on various factors, there are a variety of patterns that can create confusion during recognition. However, in accordance with an aspect of the present invention, the capability includes all of the patterns in the analysis and the coding of the identified patterns is performed based on the significance of the pattern. This reduces the confusion and significantly increases the accuracy of recognition by reducing a variety of dependencies that exist with the current tools. Also, by reconstruction, the dictionaries needed to compare and finalize the spelling are based on the ability of the system to recognize all of the components in the sound and validate the concatenated string against the dictionary.

In accordance with an aspect of the present invention, spoken words are identified in a speech segment through decomposition of the sound contours/envelopes that have been recorded. Speaker independent and a system with little to no training requirement, this capability helps identify the words in a continuous speech segment recorded with a normal microphone at lower end of sound capture rate features.

In one aspect of the present invention, the speech segment is broken down into words and words into soundlets based on silence measured in the speech segment. Each soundlet is broken into further components. From the envelope of each of the components, a set of patterns is identified and these patterns are grouped in a way that enables detection of the common patterns of the implied sound. There are six primary patterns that are identified for consonant and vowel identification and the combination of these patterns help identify the vowels and consonants in the soundlet components.

Although various embodiments are described above, these are only examples. Many variations can be made without departing from the spirit of the present invention. For example, other defined features can be used as the comparison to the identified features. Further, one or more of the identified features can be different than described herein, and/or the number of identified features can be different. Yet further, other defined feature sets can be used for the comparison. Moreover, other languages may be represented. Still further, devices other than those described herein may include one or more aspects of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of identifying words in a speech segment, said method comprising:
   obtaining, by a device, a speech segment; and
   determining, by the device, one or more words of the speech segment, said determining, for a word, comprising:

identifying one or more soundlets within the word, wherein a soundlet of the one or more soundlets has a sound wave associated therewith, the sound wave having a sound wave contour, and the identifying for the soundlet comprises:
    analyzing the sound wave contour of at least a portion of the sound wave of the soundlet to determine one or more variations within the sound wave contour;
    assigning one or more features to the one or more variations; and
    mapping the one or more features to one or more sound constructs,
wherein the one or more sound constructs are at least part of the word.

2. The method of claim 1, wherein the determining comprises identifying a specified period of silence to indicate termination of a word within the speech segment.

3. The method of claim 2, wherein the identifying a soundlet comprises identifying a predefined period of silence to indicate the soundlet, wherein the specified period of silence to indicate termination of the word is longer than the predefined period of silence to indicate the soundlet.

4. The method of claim 1, wherein the assigning of a feature to a variation comprises selecting a feature from a plurality of features based on slope characteristics of the sound wave contour representing the soundlet.

5. The method of claim 4, wherein the plurality of features comprises:
    feature 1 having a characteristic of the sound wave varying rapidly around the zero value in positive and negative half-waves;
    feature 2 having a characteristic of a slope_change count of the sound wave being greater than a slope_zero count in a half-wave;
    feature 3 having a characteristic of slope_zero being greater than zero and slope_change being equal to zero in a half-wave;
    feature 4 having a characteristic of slope_change being greater than zero and slope_zero being equal to zero in a half-wave;
    feature 5 having a characteristic of slope_zero being greater than slope_change in a half-wave; and
    feature 6 having a characteristic of slope_positive being greater than zero in a half-wave.

6. The method of claim 1, wherein the mapping comprises:
    sequencing out at least a portion of features of the one or more features to provide a feature sequence; and
    comparing the feature sequence to one or more defined sequences to identify one or more sound constructs of a selected language.

7. The method of claim 6, further comprising forming the word by sequencing the sound constructs.

8. The method of claim 7, wherein the sound constructs include at least one vowel, said at least one vowel being indicated by at least one inflection point in the sound wave.

9. The method of claim 6, wherein the sequencing out at least a portion of the one or more features comprises:
    selecting, from the one or more features, one or more dominant features; and
    sequencing the dominant features in order of identification.

10. A system of identifying words in a speech segment, said system comprising:
    a device to obtain a speech segment, and to determine one or more words of the speech segment, wherein to determine a word of the speech segment, the device performs a plurality of actions comprising:
        identifying one or more soundlets within the word, wherein a soundlet of the one or more soundlets has a sound wave associated therewith, the sound wave having a sound wave contour, and the identifying for the soundlet comprises:
            analyzing the sound wave contour of at least a portion of the sound wave of the soundlet to determine one or more variations within the sound wave contour;
            assigning one or more features to the one or more variations; and
            mapping the one or more features to one or more sound constructs, wherein the one or more sound constructs are at least part of the word.

11. The system of claim 10, wherein to assign a feature to a variation comprises selecting a feature from a plurality of features based on slope characteristics of the sound wave contour representing the soundlet.

12. The system of claim 11, wherein the plurality of features comprises:
    feature 1 having a characteristic of the sound wave varying rapidly around the zero value in positive and negative half-waves;
    feature 2 having a characteristic of a slope_change count of the sound wave being greater than a slope_zero count in a half-wave;
    feature 3 having a characteristic of slope_zero being greater than zero and slope_change being equal to zero in a half-wave;
    feature 4 having a characteristic of slope_change being greater than zero and slope_zero being equal to zero in a half-wave;
    feature 5 having a characteristic of slope_zero being greater than slope_change in a half-wave; and
    feature 6 having a characteristic of slope_positive being greater than zero in a half-wave.

13. The system of claim 10, wherein to map comprises:
    sequencing out at least a portion of features of the one or more features to provide a feature sequence; and
    comparing the feature sequence to one or more defined sequences to identify one or more sound constructs of a selected language.

14. The system of claim 13, wherein the sequencing out at least a portion of the one or more features comprises:
    selecting, from the one or more features, one or more dominant features; and
    sequencing the dominant features in order of identification.

15. An article of manufacture comprising:
    at least one computer usable medium having computer readable program code logic to facilitate identifying words in a speech segment, said computer readable program code logic when executing performing the following:
        obtaining, by a device, a speech segment; and
        determining, by the device, one or more words of the speech segment, said determining, for a word, comprising:
            identifying one or more soundlets within the word, wherein a soundlet of the one or more soundlets has a sound wave associated therewith, the sound wave having a sound wave contour, and the identifying for the soundlet comprises:
                analyzing the sound wave contour of at least a portion of the sound wave of the soundlet to determine one or more variations within the sound wave contour;
                assigning one or more features to the one or more variations; and mapping the one or more features to one or more sound constructs, wherein the one or more sound constructs are at least part of the word.

16. The article of manufacture of claim 15, wherein the assigning of a feature to a variation comprises selecting a feature from a plurality of features based on slope characteristics of the sound wave contour representing the soundlet.

17. The article of manufacture of claim 16, wherein the plurality of features comprises:
    feature 1 having a characteristic of the sound wave varying rapidly around the zero value in positive and negative half-waves;
    feature 2 having a characteristic of a slope_change count of the sound wave being greater than a slope_zero count in a half-wave;
    feature 3 having a characteristic of slope_zero being greater than zero and slope_change being equal to zero in a half-wave;
    feature 4 having a characteristic of slope_change being greater than zero and slope_zero being equal to zero in a half-wave;
    feature 5 having a characteristic of slope_zero being greater than slope_change in a half-wave; and
    feature 6 having a characteristic of slope_positive being greater than zero in a half-wave.

18. The article of manufacture of claim 15, wherein the mapping comprises:
    sequencing out at least a portion of features of the one or more features to provide a feature sequence; and
    comparing the feature sequence to one or more defined sequences to identify one or more sound constructs of a selected language.

19. The article of manufacture of claim 18, wherein the sequencing out at least a portion of the one or more features comprises:
    selecting, from the one or more features, one or more dominant features; and
    sequencing the dominant features in order of identification.

20. A method of deploying logic on a device to identify words in a speech segment, the method comprising:
    installing logic on the device, the logic to:
        obtain a speech segment; and
        determine one or more words of the speech segment, wherein to determine a word of the speech segment, the logic performs a plurality of actions comprising:
            identifying one or more soundlets within the word, wherein a soundlet of the one or more soundlets has a sound wave associated therewith, the sound wave having a sound wave contour, and the identifying for the soundlet comprises:
                analyzing the sound wave contour of at least a portion of the sound wave of the soundlet to determine one or more variations within the sound wave contour;
                assigning one or more features to the one or more variations; and
                mapping the one or more features to one or more sound constructs, wherein the one or more sound constructs are at least part of the word.

* * * * *